United States Patent [19]

Loveless

[11] Patent Number: 4,493,947
[45] Date of Patent: Jan. 15, 1985

[54] SECURITY DEVICE UTILIZING CONVENTIONAL TELEPHONE LINES

[76] Inventor: John H. Loveless, 2566 Salem Bottom Rd., Westminster, Md. 21157

[21] Appl. No.: 309,227

[22] Filed: Oct. 6, 1981

[51] Int. Cl.³ .......................................... H04M 11/04
[52] U.S. Cl. ................................ 179/2 A; 179/5 R; 179/84 VF; 179/90 BD
[58] Field of Search ................. 179/2 A, 2 AM, 5 R, 179/5 P, 1 MN, 175.2 C, 6.07, 6.11, 90 B, 90 BD, 84 VF; 381/56, 57

[56] References Cited

U.S. PATENT DOCUMENTS

| 3,829,616 | 8/1974 | Blouch | 179/2 A |
| 4,095,050 | 6/1978 | Beachem et al. | 179/2 A |
| 4,121,053 | 10/1978 | Dick | 179/2 A |
| 4,284,849 | 8/1981 | Anderson et al. | 179/5 R |
| 4,371,751 | 2/1983 | Hilligoss, Jr. et al. | 179/5 P X |

Primary Examiner—Gene Z. Rubinson
Assistant Examiner—W. J. Brady
Attorney, Agent, or Firm—John J. Byrne; Edward E. Dyson; Bradford E. Kile

[57] ABSTRACT

A security device connected to telephone lines and to at least one sensor comprises a monitoring circuit for monitoring at least one sensor to determine a status of each sensor and to detect when the status of any sensor is a fault status, an automatic call-up circuit settable by the user of the device in accordance with a preselected telephone number to be called for automatically calling the preselected telephone number to report when any status comprises a fault status, and an answer circuit for receiving and answering any incoming telephone call received over the telephone line, and responsive to reception of a user input transmitted over the telephone lines, and designating a selected sensor to be monitored, for monitoring the sensor and transmitting the status of the sensor over the telephone line. Features of the invention include an automatic call-up circuit in which a preselected telephone number is preset and is automatically called in the event of a fault status, and an automatic answering circuit in which a deceiver ring signal is generated whenever a remote telephone is used to call the device over the telephone lines. Still further features of the invention include a device identifier transmission capability, a fault signal testing capability, an automatic call-up testing capability, an automatic hang-up capability, and use of a microphone to detect sounds in the environment in which the device is located, and to transmit the sounds over the telephone lines to the user.

15 Claims, 11 Drawing Figures

SECURITY DEVICE UTILIZING CONVENTIONAL TELEPHONE LINES

DESCRIPTION

1. Technical Field

The present invention relates to a security device utilizing telephone lines, and more particularly to a monitoring system which uses a conventional Touch-Tone (Touch-Tone is a registered trademark of the American Telephone and Telegraph Company) telephone connected to a standard voice-grade transmission system to inquire into and obtain a tonal response of the status of each of a plurality of remote sensors.

2. Background Art

Prior art technology has included various devices for monitoring and/or controlling equipment from remote locations.

As an example, U.S. Pat. No. 4,095,050-Beachem et al discloses a device for monitoring and controlling equipment, such as an agricultural irrigation system, wherein the device can be called by an ordinary telephone from anywhere and, after answering the telephone, the device monitors and indicates to the caller the system status, that is, whether the system and certain system parameters are operating. The device of this patent is so designed that, if the caller is calling on a conventional Touch-Tone telephone, the caller can then access the system with a confidential three-digit access code. Once the system recognizes and verifies the access code, the calling operator can use two-digit commands to start and stop system components, as well as to monitor those and other components to ensure that the controlled system is operating properly. Another feature of the device of this patent comprises an automatic "hang-up" feature so that, if the command to hang up the telephone after the system has been monitored and controlled is not operable, the device itself will assure that the telephone is disconnected.

One disadvantage with a system similar to that disclosed in the above-mentioned patent resides in the fact that any caller can dial the number in question and, with no more than a little experimentation, gain access to the system and manipulate the device so as to accomplish the monitoring and control functions. This disadvantage could be overcome if the device provided the user with the capability of selecting a new user code at will.

Another disadvantage of such prior art devices resides in the fact that an unknowing person who dials the number in question will, after the device answers the call, encounter suspicious operational sounds, that is, sounds attendant to the operation of the device in performance of the monitoring function, as well as the function of reporting the results of monitoring (by, for example, various sensor signals or tones) to the caller.

The prior art has also included other arrangements which are less sophisticated relative to the arrangement of Beachem et al, and which involve various Touch-Tone systems, as well as other systems not involving the Touch-Tone capability. Such types of prior art systems are, for example, disclosed in the following U.S. Pat. Nos. 4,016,360; 4,232,195; 3,325,598; 3,647,971; 3,787,624; and 4,085,292.

DISCLOSURE OF INVENTION

The present invention relates to a security device utilizing conventional telephone lines and a Touch-Tone dialing system, which security device overcomes the previously discussed disadvantages of the prior art. More particularly, the invention is directed to a monitoring system by means of which a conventional Touch-Tone telephone, connected to a standard voice-grade transmission system, can be used to inquire into and obtain a tonal response of the status of each of a plurality of remote sensors. Particularly advantageous features of the invention include the employment of a user-selectable code and the provision of a deceiver ring signal. These features, as well as other features of the present invention, will be discussed in more detail below.

Another feature of the present invention resides in the fact that the device of the present invention is provided with the capability of automatically calling, at predetermined time intervals or predetermined times, a predetermined or preset telephone number for the purpose of reporting the status of each of the sensors connected to the device. Thus, this automatic call-up feature relieves the user of the device from the responsibility of remembering to periodically call the device in order to inquire as to the status of the various sensors. In conjunction with this capability, a further feature of the invention enables the user, at the preset telephone number called, to query the calling device as to its identity, at which point the calling device transmits identifying information displayed to the user.

Therefore, it is an object of the present invention to provide a security device which utilizes conventional telephone lines and the Touch-Tone dialing system.

It is another object of the present invention to provide a security device which serves as a monitoring system, and by means of which a conventional Touch-Tone telephone connected to a standard voice-grade transmission line can be used to inquire into, and obtain a tonal response relative to, the status of each of a plurality of remote sensors connected to the device.

It is another object of the present invention to provide a security device having automatic call-up circuitry for automatically calling a predetermined or preset telephone number in order to report as to the status of the various sensors connected to the device.

It is another object of the present invention to provide the automatically called telephone with the capability of querying the calling device as to its identity, and with the further capability of displaying the identity of the calling device.

It is another object of the present invention to provide a security device having answer circuitry for responding to telephone calls made by the user to the device for the purpose of inquiring as to the status of the various sensors connected to the device.

It is a further object of the present invention to provide a security device which is actuable only by reception of a user-selectable code, which device will only provide status information upon receipt of and actuation by the user-selected code.

It is a further object of the present invention to provide a security device which, when called on the telephone lines, will generate a deceiver ring signal (similar to a conventional telephone ring signal), thus deceiving unknowing persons into believing that no one is home at the called number, and thus concealing the fact that a security device is connected to the telephone lines at the location of the called number.

The manner in which these and other objects of the invention are accomplished will become clear from the following detailed description of a preferred embodiment.

BEST MODE FOR CARRYING OUT THE INVENTION

The security device of the present invention will now be described in more detail, with reference to FIG. 1, which is a block diagram of the security device of the present invention.

Figure 1:
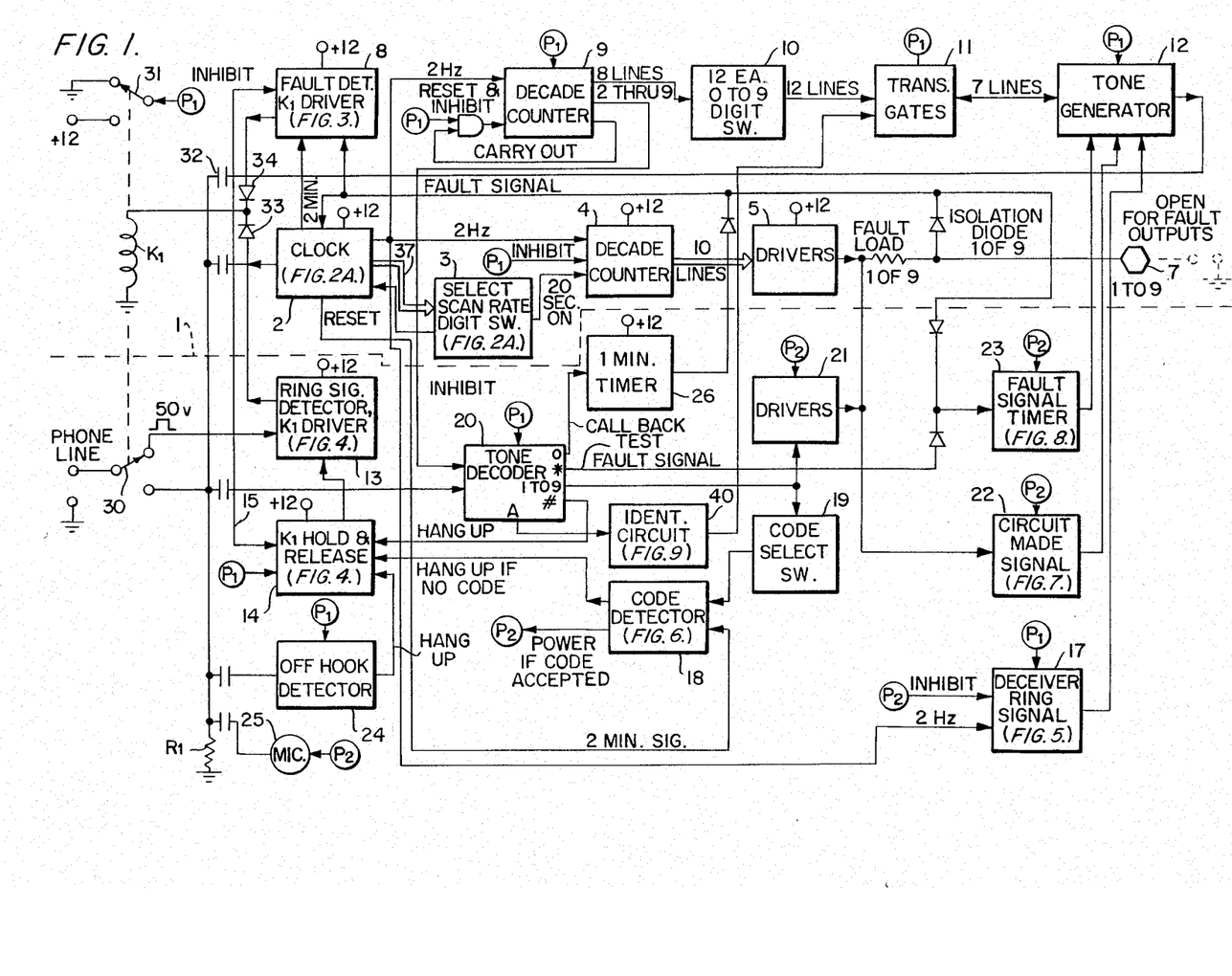
FIG. 1 is a block diagram of the security device of the present invention.

As seen in FIG. 1, the security device of the present invention basically comprises a call-up circuit, shown as a group of elements located above a dotted line 1 in FIG. 1, and an answer circuit, shown as comprising a collection of elements located below the dotted line 1 in FIG. 1. As further seen in FIG. 1, the call-up circuit basically comprises a clock 2, a select scan rate digit switch 3, a decade counter 4, drivers 5, fault load resistors 6, sensor outputs 7, a fault detector K1 driver 8, a decade counter 9, digit switches 10, transmission gates 11, and tone generator 12. The answer circuit of the security device of the present invention basically comprises a ring signal detector K1 driver 13, K1 hold and release circuit 14, timer 16, deceiver ring signal circuit 17, code detector 18, code select switches 19, tone decoder 20, drivers 21, circuit made signal 22, fault signal timer 23, off-hook detector 24, and microphone 25.

Operation of the call-up circuit (that portion of the circuit of FIG. 1 located above the dotted line 1) is as follows. A solid state clock 2, having a built-in 2 Hz. oscillator, runs continuously within the device. The clock 2 has binary outputs 37 representing various time increments, each successive output of the clock 2 representing a time increment twice that of the previous clock output. That is to say, each successive output of clock 2 corresponds to a frequency in the sequence f/16, f/32, f/64, etc., such that each successive output represents a time increment 16/f, 32/f, 64/f, etc. At a basic oscillator rate of approximately 2 Hz., this means that each successive clock output corresponds to one time interval within a sequence of time intervals (eight seconds, sixteen seconds, thirty-two seconds, etc.). In the preferred embodiment, the maximum time interval is one hour and fifteen minutes.

The select scan rate digit switch 3 is connected to the outputs from continuous (or virtually continuous) to once per hour (approximately), as set by the user who moves the select scan rate digit switch to an appropriate position corresponding to the desired scan rate. The output signal of select scan rate digit switch 3 is a twenty-second output which occurs at a rate corresponding to the scan rate set by the user using digit switch 3. Thus, if the user sets digit switch 3 for a rate of once per hour, digit switch 3 will produce a twenty-second output signal once every hour, and this signal is provided to the decade counter 4.

Since the output signal from digit switch 3 is itself a 2 Hz. signal (derived from the clock 2), the decade counter 4 is driven at this rate, and, as a result, the decade counter 4 sequentially (as a result of its counting operation) drives nine power stages of driver 5, each power stage being actuated for 0.5 seconds. It should be noted that the decade counter 4 has a carry output which is fed back to its reset input, so that, upon completion of a full counting sequence, the decade counter 4 resets itself.

The drivers 5 include a transistor array (NPN transistor array CA3082, manufactured by RCA Corporation), the array including five transistors per chip, and a total of two chips, so as to include ten transistors in all. As a result of sequential actuation of the transistors within the drivers 5, power is sequentially applied to each of the fault load resistors 6 (in the preferred embodiment, a total of nine fault load resistors is provided), and this results in sequential application of a sensing voltage to the output sensors 7 (in the preferred embodiment, a total of nine output sensors is provided).

The output sensors 7 are normally connected to ground, causing the voltage applied thereto to be dropped across the load resistors 6. If all nine output sensors 7 are grounded, no fault is detected, and this results in stopping of the clock 2 once the twenty-second scan period is over. The scan period will not be repeated again for a given time interval, corresponding to the scan rate set on the digit switch 3.

When a fault occurs, the output circuit between the particular output sensor 7 and ground is opened. When an output circuit is opened, voltage will not be dropped across a corresponding one of the load resistors 6, and this will be detected by the fault detector K1 driver 8. The operation of fault detector K1 driver 8 will be described in more detail below, with reference to FIG. 3 of the drawings. In any event, upon detection of a fault by fault detector 8, the detector 8 pulls in the relay K1 (via diode 34), connecting the phone line to the circuit by means of switch 30 connected between the phone line and ring signal detector 13. The phone line remains connected to the circuit (via switch 30) for a two-minute interval, as determined by a two-minute output from the clock 2 to the detector 8. At the same time, relay K1 actuates switch 31 so as to apply 12-volt power (P1) to selected elements in the device of FIG. 1.

As a result of reception of power P1, decade counter 9 begins its counting operation, the counter 9 being driven at a 2 Hz. rate by the clock 2. As a result of its 2 Hz. operation, the counter 9 sequentially turns on eight outputs which are connected, via digit switch 10, to transmission gates 11.

Digit switch 10 includes a plurality of (for example, eight) ten-position, single-pole rotary switches. More specifically, digit switch 10 includes one rotary switch for each digit of a phone number to be set by the user. Thus, digit switch 10 would include a minimum of seven switches to accommodate a conventional seven-digit telephone number, eight digit switches in order to accommodate the selection of a "1" prefix on a telephone number (such as, for out-of-the-area telephone calls), or even ten rotary switches to accommodate a long-distance telephone call (including area code).

Transmission gates 11 are made up of three bilateral switches, Model Number CD4066, manufactured by RCA Corporation. Each bilateral switch comprises a chip having four bilateral switches on it, so that transmission gates 11 comprise twelve bilateral switches in all. Each of the bilateral switches is connected to a tone generator 12 so that, when the switch is closed, a two-wire connection is formed with respect to the tone generator 12. Such a connection results in generation, by tone generator 12, of a dual-frequency tone corresponding to one of the tones generated in a typical Touch-Tone system.

Thus, in operation, the counter 9 sequences through its count values so as to successively enable the various switches contained within digit switch 10, thus sequentially activating the twelve bilateral switches within transmission gates 11. Each successive actuation of one of the switches in digit switch 10 results in generation of a dual-tone signal by tone generator 12, that signal corresponding to a particular digit of the telephone number, as preset by the user in digit switch 10.

Tone generator 12 is, preferably, an ICM 7206, manufactured by Signetics, Inc., and generates the standard Touch-Tone signals, as previously explained. The tone generator output signals are transmitted to the phone line, via capacitor 32 and switch 30. After the decade counter 9 has counted to its full count, and the telephone number has been dialed, the "carry" output of counter 9 is, after being AND'ed with power P1, provided to the reset input of counter 9, and the counter is stopped.

For the remainder of the two-minute period, as measured by clock 2, the K1 driver 8 remains on, holding the phone line connected to the security device, and allowing the telephone corresponding to the dialed phone number to ring. After two minutes, however, the K1 driver 8 will be disabled, and will drop out the relay K1, disconnecting the security device (via switch 30) from the phone line. The security device will then await a further monitoring period, as dictated by the select scan rate digit switch 3.

The answering circuit of the security device of FIG. 1 operates as follows. At any time, the user may dial the device from any telephone over the telephone lines. At this point, the phone line would be connected to the ring signal detector 13 via the switch 30, and the detector 13 would receive the ringing signal. After a certain number of rings (approximately three rings), the ring detector and K1 driver 13 will answer by pulling in the K1 relay (via diode 33), disconnecting the phone line (via switch 30) from the ring detector 13, and connecting it to the line hold resistor R1. At the same time, switch 31 will be actuated to apply +12 volts to terminal P1, thus providing power to various elements of the device. In particular, power P1 will be applied to the K1 hold and release circuit 14, the circuit 14 holding the relay K1 via actuation of the K1 driver within the ring signal detector and K1 driver circuit 13, the latter being connected via diode 33 to the relay K1. In addition, an inhibit signal will be transmitted from K1 hold and release circuit 14 to the fault detector and K1 driver circuit 8 to prevent circuit 8 from responding to any faults detected from the sensor outputs 7.

Upon pull-in of the relay K1, the 2 Hz. output of clock 2 powers the deceiver ring signal circuit 17, and the two-minute output of clock 2 activates the code detector circuit 18 for a two-minute period. The deceiver ring signal circuit 17 actuates the tone generator 12 to transmit a deceiver ring signal, similar to a standard telephone ring signal (for example, repetition of a one-second ring followed by three seconds of silence). The ring is generated by modulating the tone generator (the 687 Hz. output thereof) with an appropriate clock output from the clock 2 (the latter being connected to the tone generator 12 through the deceiver ring signal circuit 17). The generation of this deceiver ring signal has the advantage of preventing an unknowing caller from knowing that a security device is connected to the telephone line. That is, since the unknowing caller hears a ring-back signal (the deceiver ring signal), the caller concludes that no one is at home at the dialed telephone number.

On the other hand, the knowledgeable user, hearing the deceiver ring signal, knows that he has a two-minute period to inject his three-digit security code (which he has previously set in the code select switches 19). The security code is entered at the remote telephone by depressing the appropriate Touch-Tone buttons in the proper sequence during the "off" cycle (the three seconds of silence between rings) of the deceiver ring signal. The tone decoder 20 will detect the tones received from the remote telephone, and route the signals through code select switches 19 to the code detector 18. The tone decoder 20 is, preferably, implemented by a telecommunication chip, Model 3210, manufactured by ITT North Microsystems. Code select switches 19 are similar to digit switches 10. More specifically, code select switches 19 comprise three rotary switches, each set to a given digit of the security code, so that the signal received by code select switches 19, if it corresponds to one of the switch settings, is passed through to code detector 18. As will also be explained in more detail below, code detector 18 receives the signals passed through code select switches 19 in sequence, determines whether or not all three signals corresponding to the digits of the security code are present in the proper sequence, and, if so, applies power P2 to various further elements of the device. In addition, the deceiver ring signal 17 will be inhibited. If a proper code is not detected by code detector 18 within the two-minute period, code detector 18 will be disabled, and detector 18 will in turn release relay K1, via K1 hold and release circuit 14, thus terminating the incoming telephone call.

Upon acceptance of the code by code detector 18, as described above, power P2 is applied to various elements, including drivers 21, circuit-made signal 22, and fault-signal timer 23. At this point, the user may now, using his remote telephone, query any of the nine sensors 7 by depressing an appropriate Touch-Tone button (1 through 9) on his telephone. The generated and transmitted tone is received by tone decoder 20, and a corresponding tone decoder output signal is transmitted to drivers 21. Drivers 21 are similar to drivers 5, consisting of an NPN transistor array CA3082 (manufactured by RCA Corporation), there being five transistors per chip and two chips, for a total of ten transistors, one connected to each output of tone decoder 20. The individual transistors act as a diode, so as to prevent feedback of output from drivers 21 to drivers 5. Thus, as a result of selective generation of a tone from the remote telephone, drivers 21 selectively provide a voltage, via fault load resistor 6, to a corresponding one of the sensor outputs 7. Upon release of the Touch-Tone button by the user, the circuit-made signal 22 actuates the tone generator 12 for a short time interval, as modulated by the clock 2, to generate a 900 Hz. signal from generator 12. This signal, transmitted over the telephone lines to the user, indicates that the circuit is being checked. If a fault is indicated by the fault load resistor 6, as described above, fault signal timer 23 will be actuated to provide an output to tone generator 12 so as to command the 200 Hz. signal of the tone generator 12 for a two-second period. Detection of this tone by the user at the remote telephone indicates that a fault has been detected at the sensor which was selected by the user when he pressed the corresponding Touch-Tone button. Absence of a return tone indicates to the user that no fault has been detected. Alternatively, of course, it is within the scope of the invention to provide for generation, by tone generator 12, of a different frequency tone (such as a much higher frequency tone) upon non-detection of a fault at the particular sensor.

If the user, instead of pressing one of the digit buttons 1 through 9 on his telephone, presses the "*" button, a test fault signal will be generated by the tone decoder 20, the test fault signal being provided via diode 34 to the fault signal timer 23 which, in turn, will command the 200 Hz. signal of tone generator 12 for a two-second period, providing feedback to the user in response to his test command.

In addition, if the user actuates the "#" button of his telephone, the tone decoder 20 automatically issues a "hang up" command to the K1 hold and release circuit 14, and the latter will release the relay K1, thus terminating the phone call via switch 30.

In the event that the user forgets to depress the "#" button to hang up the line, an off-hook detector circuit 24 is provided in the security device. The off-hook detector 24 is connected to the phone line via switch 30 so as to detect the conventional receiver-off-hook signal generated by the telephone company, and, upon receipt of such signal, commands the K1 hold and release circuit 14 to release the relay K1, thus terminating the call via switch 30.

From the above, it should be apparent that an individual user may want to have more than one of the security devices so that each security device can be located at a different location, all of the security devices at the remote locations having the capability of calling the same telephone number (at the user's home or office). In such a case, the user at his receiving telephone should have the capability of identifying the particular security device automatically calling that telephone.

In order to provide for such a capability, it is envisioned that, in accordance with the present invention, the user should have the capability of querying the calling security device so as to cause it to identify itself. Since the tone generator 12 and the tone decoder 20 both have hexadecimal capability (that is, 16 dual tones A, B, C, D, in addition to the standard 12 telephone buttons, may be utilized), it is envisioned that, in accordance with the invention, the "A" button be used at the receiving telephone by the user to request identification of the calling security device. In fact, a preferred embodiment of the invention calls for the provision of a separate receiver circuit at the receiving telephone, the separate receiver circuit having a push button on it for generating the tone "A", as well as a 3-digit display for displaying the identity of the calling security device, once it is received by the user.

Thus, once the user acquires control of the calling security device, he would push the "A" button on the receiver, and the tone decoder 20 in the device would produce a high level for the "A" output thereof, which output actuates the identification circuit 40. The identification circuit 40, in turn, drives transmission gates 11 so as to cause tone generator 12 to transmit those tones indicated by the identification circuit 40. This capability will be described in more detail below.

To summarize, the device of the present invention, and more particularly the call-up circuit thereof, does not call the user unless a fault is detected during the monitoring process, which monitoring process takes place at selected time intervals, as set by the user in select scan rate digit switch 3. In the event that there is a fault, and the device does call the user, the user, upon answering his telephone, will hear a 2 Hz. clicking signal generated by the clock 2. This will identify the device for the user. The user now has the options of allowing the device to hang up after the two-minute period is up, or of commanding the device to check one or more of the output circuits, using the appropriate Touch-Tone buttons on his telephone, so as to determine which sensor is at fault.

To command the device after it has called the user, the user must punch in his personal code within the time remaining (within the two-minute time interval as determined by the clock 2), and, on accepting the personal code of the user, the device will switch over to the operating mode of the answering circuitry. The user then (as previously described) can test any of the sensors by operation of the buttons on his telephone.

Provision is made to allow the user to test the tonelike response of the device, that is, the operation of tone generator 12, by pressing the "*" button on his telephone, to generate a test fault signal from tone decoder 20. In addition, the security device of the present invention provides the user with the capability of testing the automatic dial-out capability of the automatic call-up circuit. That is to say, while commanding the device, either after it has called the user or after the user has called it, the user can depress the "0" button and this will initiate a one-minute timer 26. The user can then push the "#" button, causing the tone decoder 20 to activate the K1 hold and release circuit 14, to release the relay K1, thus terminating the phone call via switch 30. After the timer 26 has run out, it will inject a signal back into the fault detector 8, and this will cause the device to recall the user. Thus, the user will be able to verify the operation of the automatic call-out function of the device.

In a preferred embodiment, the device comprises a hybrid circuit, although most of the circuitry is implemented in digital fashion. The device is preferably powered by a 12 volt Nicad battery. The nine output circuits are connected to monitor sensors, and may also be connected to command some function, such as turning on lights, indicators, a motor, or any combination of the latter.

Finally, it is to be recognized that a microphone 25, powered by power P2, can be connected to the phone lines via switch 30, and upon activation by power P2, can be utilized to monitor the environment in which the security device is located, and to provide sounds resulting from such monitoring over the telephone lines to the user at his telephone.

The security device of the present invention will now be described in more detail, with reference to the more detailed figures of the drawings.

Figure 2A:
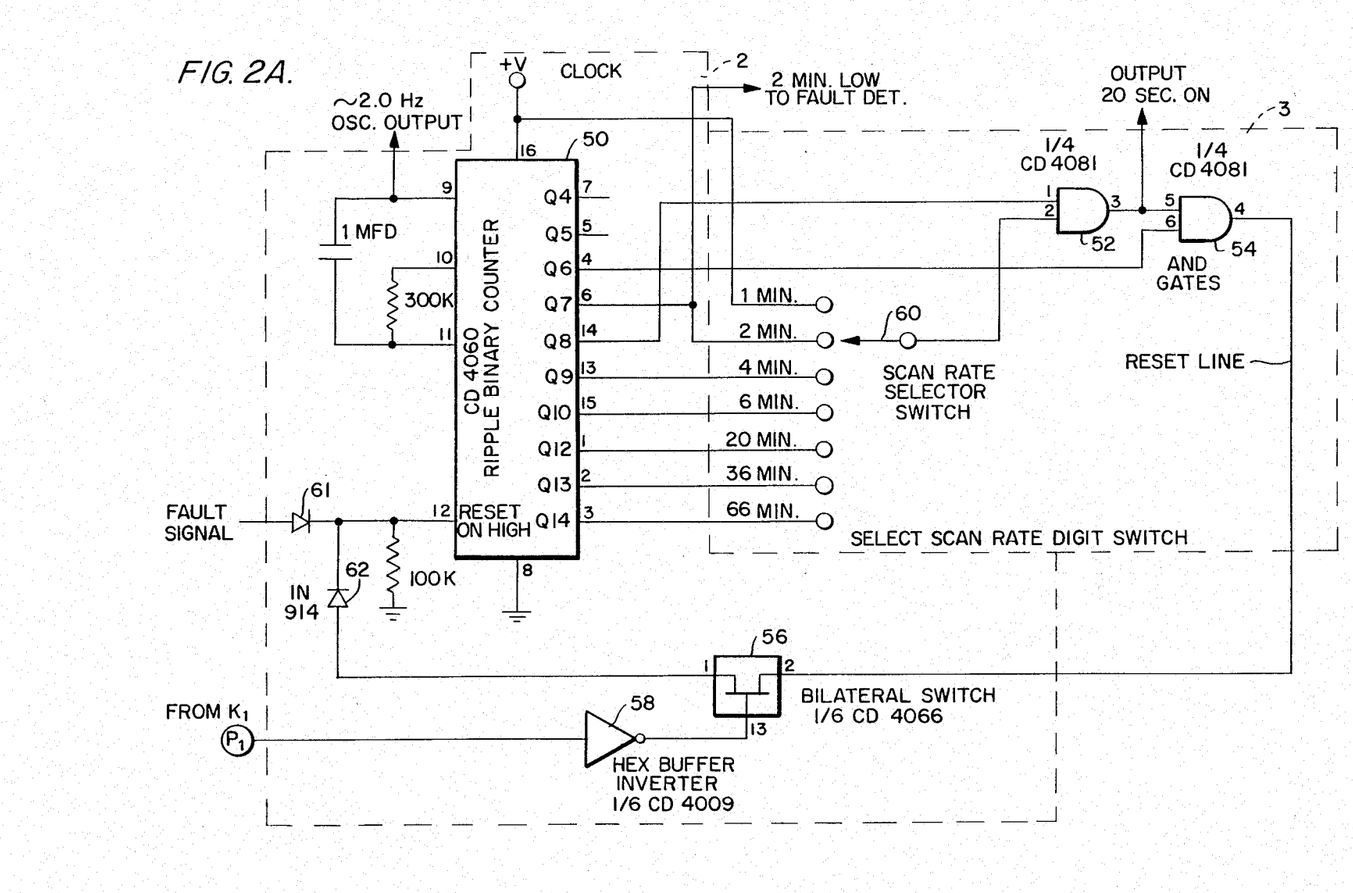
FIG. 2A is a detailed diagram of the clock 2 and the select scan rate digit switch 3 of FIG. 1.

FIG. 2A is a detailed diagram of the clock 2 and the select scan rate digit switch 3 of FIG. 1. As seen therein, the clock 2 generally comprises a counter 50, bilateral switch 56, inverter 58, and diode 62, while the select scan rate digit switch 3 generally comprises a scan rate selector switch 60 and AND gates 52 and 54.

The counter 50 is, preferably, a ripple binary counter (CD 4060) device, consisting of an oscillator section and 14 ripple-carry binary counter stages. The counter 50 is advanced, one step at a time, in binary order on the negative transition of the oscillator, the oscillator running at a frequency of about 2.0 Hz. (1.8 Hz. to be more exact). The time intervals between activation of each of the eleven binary outputs Q4–Q14 of the counter 50 have a 2:1 relationship with respect to adjacent outputs, such that the time interval for each output is doubled sequentially with respect to the time interval of the preceding output (16/f for the Q4 output, 32/f for the Q5 output, and so forth).

AND gates 52 and 54 (preferably implemented by a CD 4081 device) require two positive-going signals to result in a high output. AND gate 52 receives the Q8 output from counter 50, as well as the output selected by scan rate selector switch 60, and, when these two signals go high simultaneously, the output of the AND gate 52 goes high. This provides a "20 second on" output (provided by the select scan rate digit switch 3 to the decade counter 4 of FIG. 1).

The latter output signal is compared, in AND gate 54, to a reset signal, provided by the Q6 output of counter 50, and, when both of these inputs to AND gate 54 are high, the output of AND gate 54 goes high, and generates a reset line output, which is provided to bilateral switch 56. Bilateral switch 56 is closed during the scan operation of the device, allowing reset of the counter 50 to occur. More specifically, since the bilateral switch 56 requires a high level for the switch to conduct, an inverter 58 is provided between the relay K1 and the switch 56, such that the switch 56 will be closed during the scan operation, thus allowing reset of the counter 50. On reset, all of the outputs of the counter 50 go back to a low state instantaneously, and the process begins anew.

When a fault is detected during the scan operation, and the relay K1 is subsequently pulled in, the bilateral switch 56 opens, and the reset line of counter 50 is unable to reset the counter 50. This is necessary due to the fact that the outputs of counter 50 are used for other functions, and a reset, at this point, would disrupt the timing sequences. Reset is only required during a scan operation, and scan only occurs when the relay K1 is relaxed. Accordingly, when the relay K1 is relaxed, a high output is provided by the inverter 58 to the bilateral switch 56, thus closing the switch 56 and permitting reset of the counter 50 on generation of a reset line output by AND gate 54.

Figure 2B:
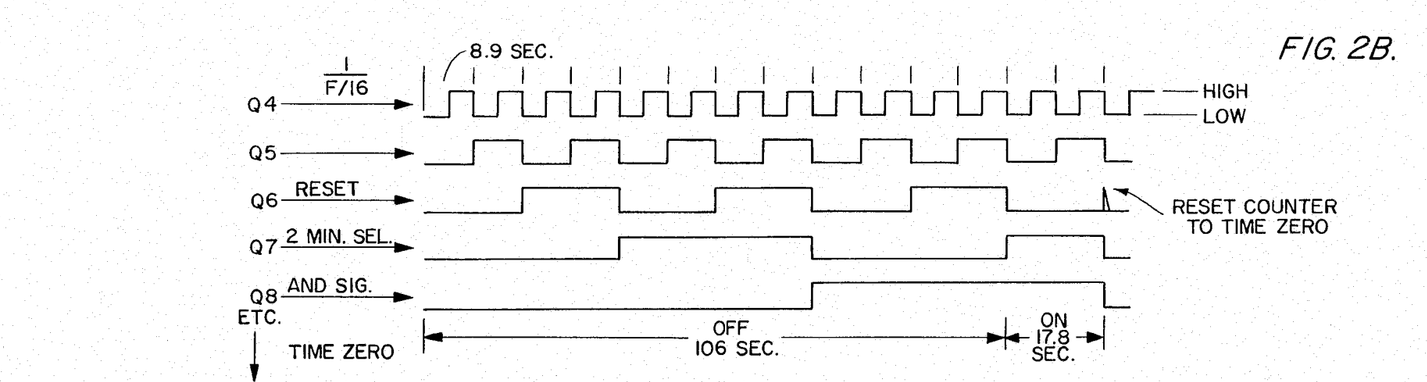
FIG. 2B is a timing diagram relating to the operation of the select scan rate digit switch 3 of FIG. 2A.

The operation of the clock 2 and select scan rate digit switch 3 will be better understood by reference to FIG. 2B, which is a timing diagram relating to the operation of the select scan rate digit switch 3 of FIG. 2A. As seen therein, if the scan rate selector switch 60 selects the two-minute output Q7 of counter 50, AND gate 52 will produce an output only when its inputs Q7 and Q8 are both high, and thus an output of approximately 20 seconds (17.8 seconds to be exact) will be produced. Furthermore, AND gate 54 will produce an output only when the 20-second output and the output Q6 are high; thus, the reset line output of AND gate 54 will be a spike-like impulse occurring at the end of the 20-second period. So long as the device is in the scan mode, as indicated by a high output from inverter 58, the bilateral switch 56 will be closed, and the counter 50 will be reset.

Figure 3:
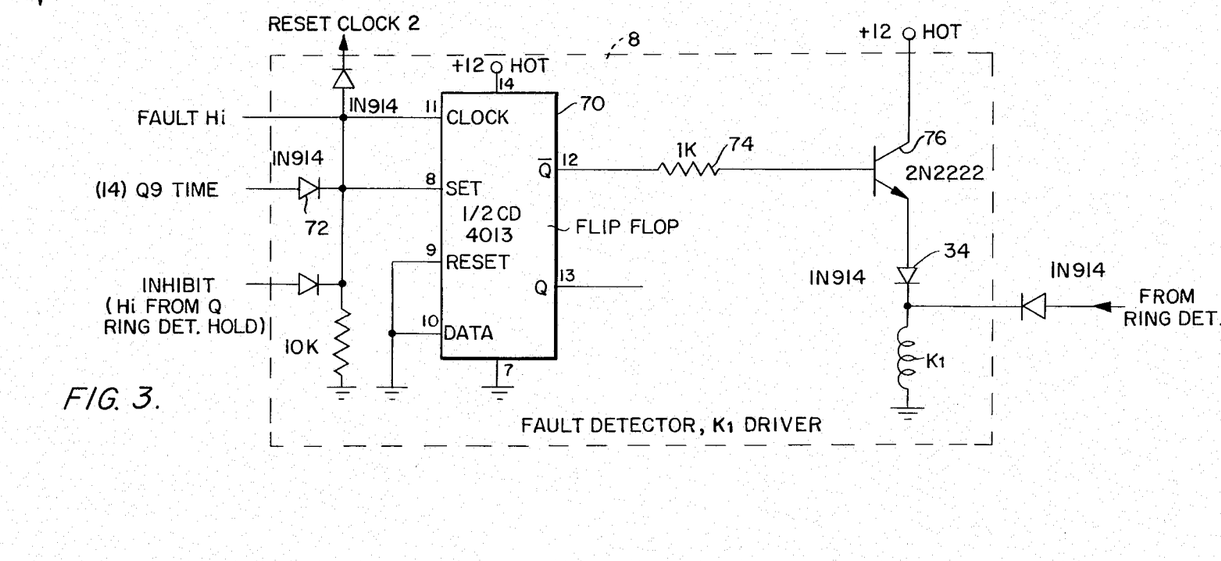
FIG. 3 is a detailed diagram of the fault detector K1 driver 8 of FIG. 1.

FIG. 3 is a detailed diagram of a fault detector K1 driver 8 of FIG. 1. As seen therein, the fault detector K1 driver 8 basically comprises a flip-flop 70, resistor 74, transistor 76, and other associated elements.

In operation, referring to FIG. 1, when no voltage is dropped across a fault load resistor (appearing at the output of drivers 5), a fault will be indicated on that particular line, resulting in a high output or fault signal provided to the fault detector K1 driver 8. Referring to FIG. 2A, this high condition is provided, via diode 61, to the reset input of counter 50, thus resetting the clock 2 back to time zero. Referring to FIG. 1, the operation of decade counter 4 and drivers 5 proceeds as usual. Further referring to FIG. 2A, once the clock 2 is reset, the output Q9 thereof goes low for a two-minute period, and this two-minute low output from the clock 2 is provided to the fault detector K1 driver 8 (FIG. 3) through diode 72 into the set input of flip-flop 70.

Initially, the QNOT output of flip-flop 70 is low, holding the transistor 76 off. When the fault signal provides a high level to the clock input of flip-flop 70, the QNOT output goes high, driving the transistor 76 (via resistor 74), thus pulling in relay K1 (via diode 34). If a personal code is not accepted by the code detector 18 within the two-minute period, the Q9 output of counter 50 goes high, and resets the flip-flop 70 through diode 72, turning the transistor 76 off and releasing the K1 relay.

Figure 4:
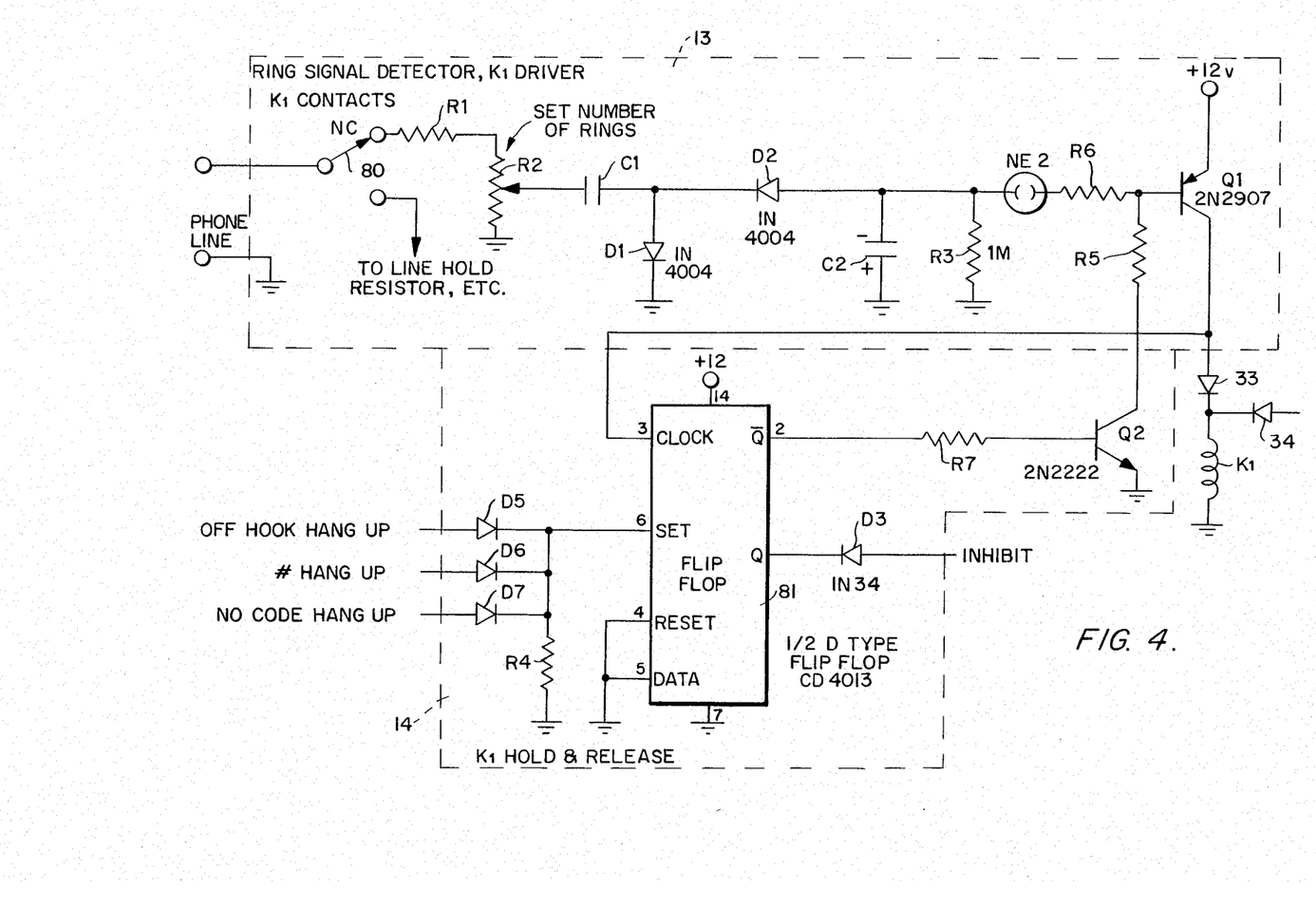
FIG. 4 is a detailed diagram of the ring signal detector K1 driver 13 and K1 hold and release circuit 14 of FIG. 1.

FIG. 4 is a detailed diagram of the ring signal detector K1 driver 13 and K1 hold and release circuit 14. As seen therein, the ring signal detector K1 driver 13 basically comprises relay contacts 80 (associated with the relay K1), a neon lamp indicator NE2, and a transistor Q1, and associated elements, while the K1 hold and release circuit 14 basically comprises a flip-flop 81, transistor Q2, and associated elements.

In operation, at rest, the phone line is connected to the ring signal detector K1 driver 13 through the normally closed contacts 80 of relay K1. Capacitor C1 blocks the DC voltage of the phone line from passing through. When the ring signal appears, capacitor C1 passes the AC signal, and diodes D1 and D2 rectify the AC signal to achieve a high level of DC voltage. Capacitor C2 charges with each ring in proportion to the setting of potentiometer 2 and bleed resistor R3. When a sufficient number of ring cycles is received, so as to induce a 60-volt voltage on capacitor C2, the neon lamp indicator NE2 conducts, turning on driver transistor Q1, and thus applying 12 volts to the coil K1, via diode 33. The neon lamp indicator NE2 continues to conduct until the voltage on capacitor C2 is dropped to about 50 volts, even though the contacts 80 of relay K1 have removed the phone line from the ringing signal detector K1 driver 13, thus answering the phone line. This hysteresis effect is necessary to prevent chatter of the relay K1. Capacitor C2 now continues to bleed down through bleed resistor R3 so as to reach 0 volts.

When the driver transistor Q1 is turned on, a high level is impressed on the clock input of flip-flop 81, causing the QNOT output thereof to go high, turning on the transistor Q2 (via resistor R7), thereby holding the relay K1 energized after the neon lamp indicator NE2 has stopped conducting. When QNOT goes high, Q goes low, providing an inhibit signal (via diode D3) for fault detector K1 driver 8 (FIG. 1). This prevents the fault detector K1 driver 8 from responding under the existing operational conditions.

The phone line will now be held until a high signal is received through any of the steering diodes D5, D6 or D7, such high signal being provided via these diodes to the set input of flip-flop 81. Resistor R4, connected between each of the diodes D5–D7 and ground, holds the set input to flip-flop 81 low when no signal is present on the input lines OFF HOOK HANGUP, # HANGUP, and NO CODE HANGUP. However, when a high signal is applied to the set input of flip-flop 81, QNOT goes low, turning off the transistor Q2, and releasing the relay K1. At the same time Q goes high, and thus removes the inhibit signal from fault detector K1 driver 8 (FIG. 1). As a result, the contacts 80 remove the phone line from the line hold resistor R1 (FIG. 1), causing a hang up to occur. The line is also connected to the ring signal detector K1 driver 13, in preparation for the next call.

Figure 5:
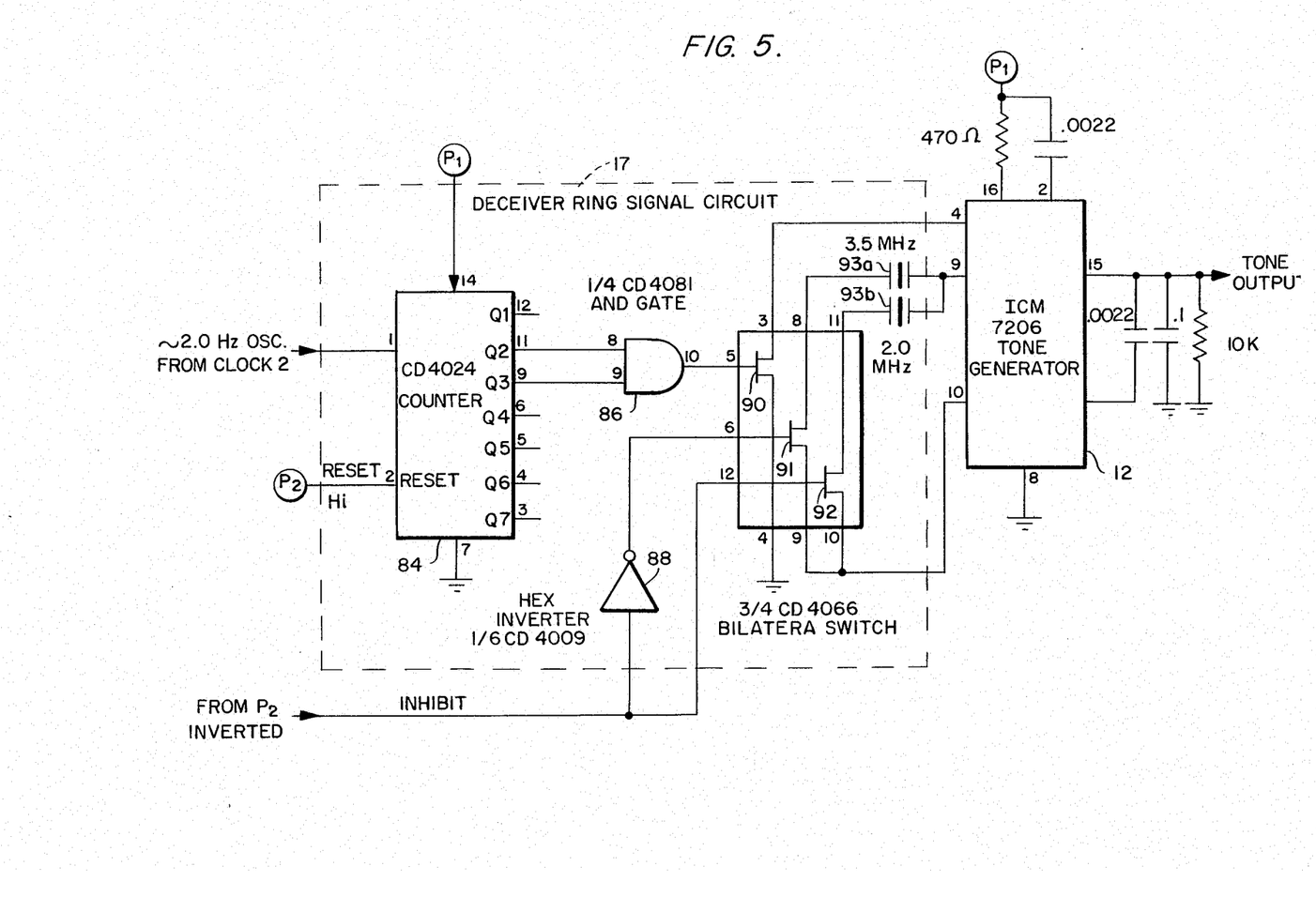
FIG. 5 is a detailed diagram of the deceiver ring signal circuit 17 of FIG. 1.

FIG. 5 is a detailed diagram of the deceiver ring signal circuit 17 of FIG. 1. As seen therein, the deceiver ring signal circuit 17 basically comprises a counter 84, AND gate 86, inverter 88, bilateral switches 90–92, and crystal oscillators 93a and 93b.

The counter 84 is, preferably, a 7-stage ripple-carry binary counter (CD4024). The 2 Hz. output from clock 2 (FIG. 1) is provided to the clock input of counter 84. The outputs Q2 and Q3 of counter 84 are summed in the AND gate 86, and this results in a signal which is high for one second, and then low for three seconds. The latter signal is generated so long as the reset input to counter 84 is held low, which is the condition occurring after the relay K1 has been pulled in, and the line has been answered. However, at that juncture, the personal code is not yet expected, and has not yet been received. Since the code detector 18 (FIG. 1) has not provided an inhibit signal, the bilateral switches 90 and 92 are closed and bilateral switch 91 is opened, so that the 2.0 MHz crystal oscillator 93b is connected across terminals 9 and 10 of the tone generator 12, and so that terminal 4 is modulated to ground potential by the one-second-on-three-second-off signal from AND gate 86.

The tone generator 12 (FIGS. 1 and 5) is, preferably, an ICM 7206 tone generator (manufactured by Intersil). Accordingly, the tone generator 12 has a truth table such that connection of terminal 4 of tone generator 12 to ground results in a 50% duty cycle with a frequency of 1215 Hz. By modulating this terminal as described above, and dropping the oscillator frequency by switching in the 2.0 MHz. crystal oscillator 93b, a signal closely resembling the standard telephone ringing signal can be produced.

The latter ringing signal continues for a two-minute period if no code is accepted by the device, at which time hang-up occurs. If a code is accepted, the code detector 18 (FIG. 1) produces two signals (discussed below), and, as already discussed, power P2 is enabled. When power P2 is enabled, this serves to reset counter 84 in the deceiver ring signal circuit 17 of FIG. 5. At this point, the inhibit signal (P2 inverted) goes low, causing bilateral switch 91 to close and bilateral switch 92 to open, thus connecting the 3.5 MHz crystal 93a across terminals 9 and 10 of tone generator 12. In such a condition, the tone generator 12 produces the standard tones of the Touch-Tone system.

Figure 6:
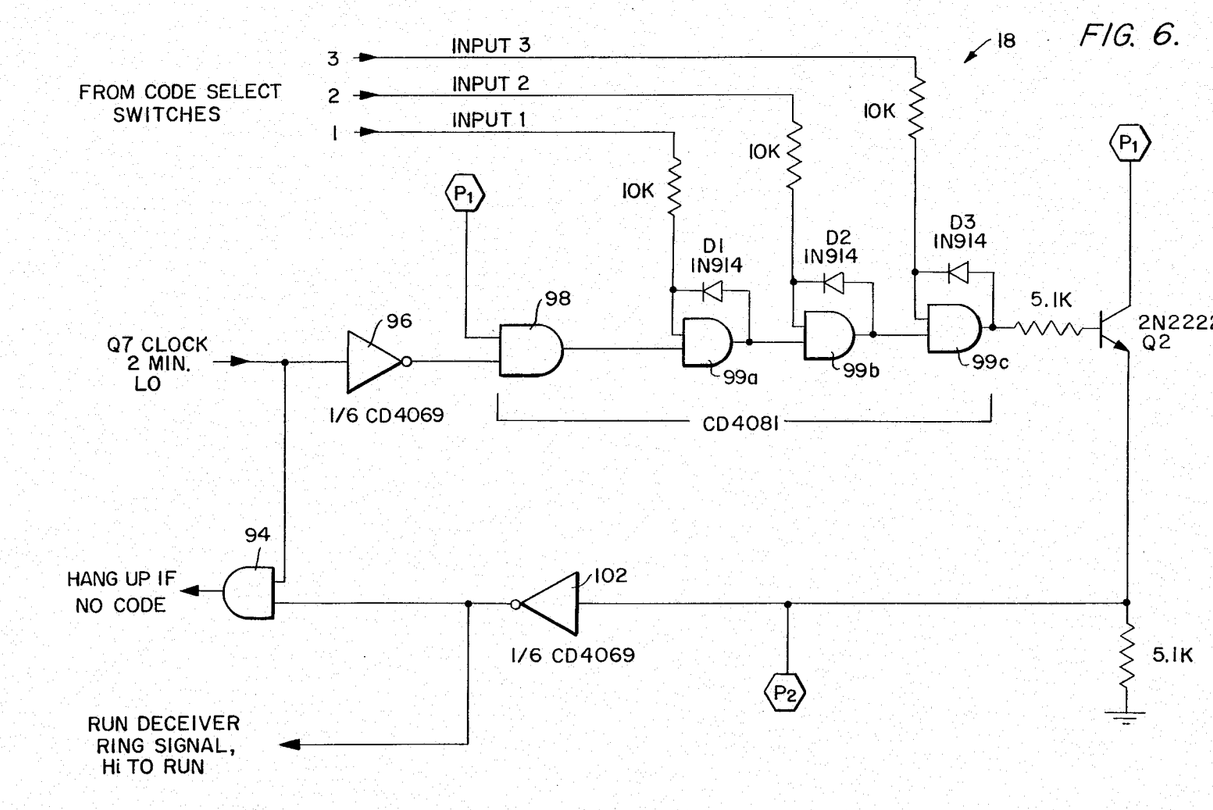
FIG. 6 is a detailed diagram of the code detector 18 of FIG. 1.

FIG. 6 is a detailed diagram of the code detector 18 of FIG. 1. As seen therein, the code detector 18 basically comprises AND gate 94, inverter 96, AND gate 98, AND gates 99a, 99b and 99c with diode feedback, transistor Q2 and inverter 102.

In operation, whenever the relay K1 (FIG. 1) is pulled in, the clock 2 is momentarily reset to time zero (as previously discussed). A two-minute low signal from the Q9 output of clock 2 (FIG. 2A) is received by the code detector 18, and is inverted by the inverter 96. The inverted output is then summed, in AND gate 98, with the power input enable P1. Input P1 is high since the relay K1 has been pulled in to answer the phone line. Therefore, the output of the AND gate 98 is high, and this impresses a plus voltage on one input of AND gate 99a. If a plus voltage is received momentarily by the code select switches (not shown) on input line 1, AND gate 99a will turn on and will be held on by feedback diode D1. This will, in turn, provide a positive input to the input of AND gate 99b. AND gates 99b and 99c operate sequentially, in the same manner, as the input line of each successive AND gate is pulsed higher. Thus, it is clear that the code must be entered by the user in proper sequence in order for the three AND gates 99a, 99b and 99c to conduct simultaneously, thus triggering the transistor Q2 which then provides power to the P2 output.

As previously indicated, the code must be entered by the user within a two-minute interval, as measured by the two-minute low signal issued by clock 2 (FIG. 1). If the code is not entered during the period, the transistor Q2 will not be pulled in before the two-minute low signal of clock 2 goes high. When the latter occurs, the AND gate 98 will not apply a positive potential to the input of AND gate 99a, and the emitter of transistor Q2 will remain at ground potential. Thus, the inverter 102 will invert the low signal appearing at its input (from the transistor Q2), and will provide a high level to the input of AND gate 94, thus allowing the high signal then provided by clock 2 to pass through AND gate 94, and to cause a hang-up to occur.

If the code is accepted within the two-minute period, the transistor Q2 will be pulled in. Thus, the emitter of transistor Q2 will apply a positive potential to the power input P2, which applies power to the other circuits. In addition, the high level will be inverted to a low level by inverter 102, which in turn will cause the output of AND gate 94 to go low, preventing the high level signal from the clock 2 from passing through to cause hang-up.

Figure 7:
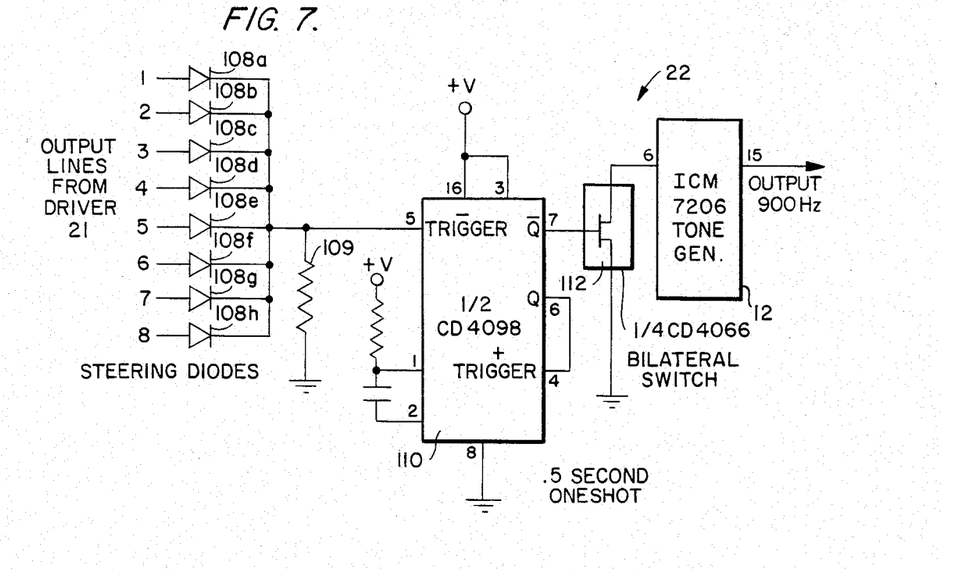
FIG. 7 is a detailed diagram of the circuit made signal circuit 22 of FIG. 1.

FIG. 7 is a detailed diagram of the circuit made signal circuit 22 of FIG. 1. As seen therein, the circuit made signal circuit 22 comprises input diodes 108a–108h, input resistor 109, one-shot device 110 and bilateral switch 112.

In operation, the circuit made signal is generated by the tone generator 12 when terminal 6 thereof is grounded. This circuit made signal amounts to a 900 Hz. tone which is turned on for one-half second by the output of one-shot device 110, the latter operating the bilateral switch 112 to ground the terminal 6 of tone generator 12.

One-shot device 110 (preferably, one-half of a CD 4098 device) is triggered on the negative transition of an input trigger pulse provided thereto. The trigger pulse is received via steering diodes 108a-108h from each individual output line of drivers 21, the diodes 108a-108h preventing cross-coupling of the output lines. Since the one-shot device 110 is triggered on the negative pulse transition, the circuit made output tone will not occur until the operator releases the Touch-Tone button for any particular line. The signal is provided to insure that the entire circuit is working, since it is initiated by the final output stage of the device.

Figure 8:
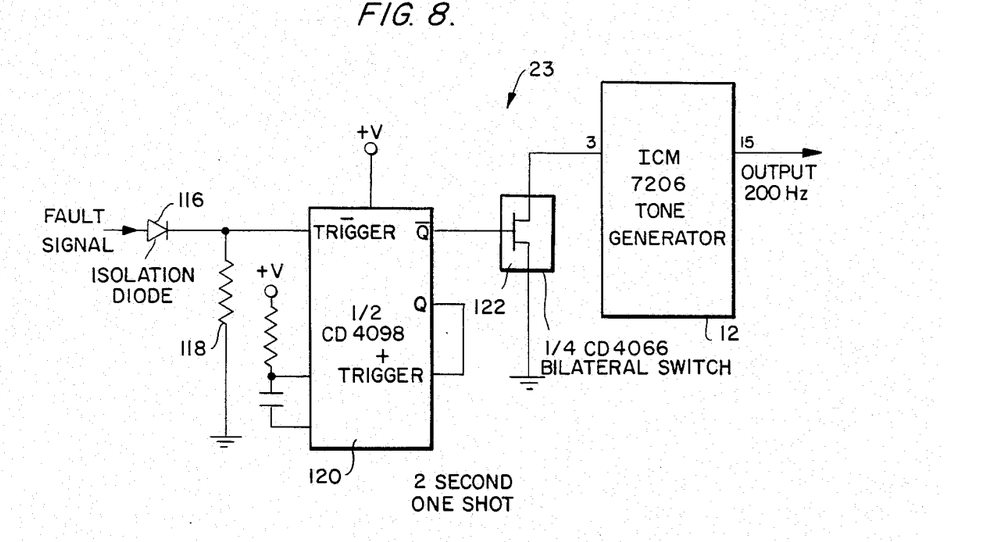
FIG. 8 is a detailed diagram of the fault signal timer 23 of FIG. 1.

FIG. 8 is a detailed diagram of the fault signal timer 23 of FIG. 1. As seen therein, the fault signal timer 23 basically comprises an isolation diode 116, input resistor 118, one-shot device 120 and bilateral switch 122.

In operation, the fault signal is produced in a manner identical, in operation, to the manner of producing the circuit made signal, with the exception that the one-shot device 120 is preferably a two-second one-shot device, whereas the one-shot device 110 (of FIG. 7) is, preferably, a one-half second one-shot device. In addition, terminal 3 of the tone generator 12 is grounded by bilateral switch 122, resulting in the generation of a 200 Hz. tone. Only one isolation diode is needed on the trigger input to the one-shot device 120 because the fault line is diode-isolated at the fault load resistors (FIG. 1).

The fault signal will occur when the operator releases his Touch-Tone button on any line that has an open circuit. Although the circuit made signal will be initiated simultaneously, it is easily distinguished because of the frequency difference, and also because the fault signal is 1.5 seconds longer (due to the difference between one-shot device 120 and one-shot device 110 of FIGS. 8 and 7, respectively).

Figure 9:
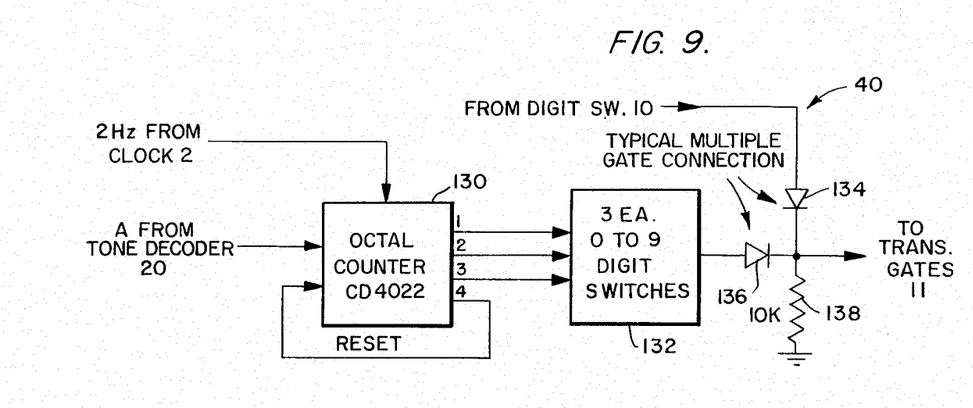
FIG. 9 is a detailed diagram of the identification circuit 40 of FIG. 1.
Figure 10:
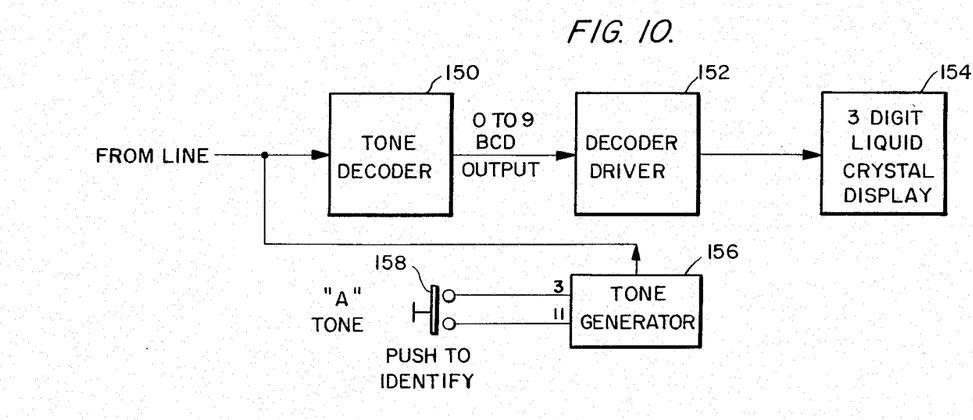
FIG. 10 is a diagram of an arrangement for displaying identification information, relating to the identity of an automatically calling device, once received by the user of the system.

FIG. 9 is a detailed diagram of the identification circuit 40 of FIG. 1, while FIG. 10 is a diagram of an arrangement for displaying identification information, such information relating to the identity of an automatically calling device.

As seen in FIG. 9, the identification circuit 40 basically comprises an octal counter 130 and digit switches 132. The identification circuit 40 has been developed as a result of the fact that an individual may want to have more than one security device at various locations, and may desire the further capability of identifying which of the security devices is automatically calling the predesignated telephone number to apprise the user of the fault condition.

Referring to FIG. 7, the circuit made signal circuit 22 issues a circuit made signal having a frequency which may be varied by connecting to an appropriate terminal on the tone generator 12. Thus, a low, medium or high frequency signal could be used to identify two or, perhaps, three units. However, when three or more units are in use, a preferred embodiment of the invention involves the incorporation of the identification circuit 40.

More specifically, since the tone generator 12 (which is preferably an ICM 7206 device) and the tone decoder 20 (which is preferably an ITT 3210 device) both have hexadecimal capability (that is, 16 dual tones, A, B, C, D, in addition to the standard 12 telephone button tones, can be generated), one of these tones (for example, the "A" tone) can be used by the user for the purpose of querying the calling device to request identification thereof.

In the latter regard, a separate receiver circuit, colocated with the user, is required for this purpose, such receiver having a push button 158 (FIG. 10) for the purpose of requesting identification of the calling device, as well as a three-position display 154 for displaying an identification number transmitted by the calling device in response to the query. Thus, once the device has automatically called the user, and the user has acquired control of the device, the user pushes the "A" button, thus transmitting the identification query to the calling device. In the calling device, the tone decoder 20 (FIG. 1) produces a high level at its "A" output, such output being provided to the identification circuit 40.

Referring to FIG. 9, the octal counter 130 (preferably, a CD 4022 device) receives the output of tone decoder 20 and commences counting in accordance with the 2 Hz. input from clock 2 of the device. The counter 130 steps through its three outputs, connected to digit switches 132, thus directing the tone generator 12 (via transmission gates 11) to produce those tones selected by the digit switches 132. The tones, thus transmitted via the telephone line, will be received at the user's location, decoded by tone decoder 150 (FIG. 10), and then displayed, via decoder driver 152, on the display 154. In this manner, the user can identify up to 999 separate devices (for a three-digit code and display).

While preferred forms and arrangements of the invention have been illustrated in this application, it is to be understood that various changes and variations may be implemented without departing from the spirit and scope of this disclosure.

What is claimed is:

1. A security device connected to telephone lines and to at least one sensor, comprising:

monitoring means for monitoring said at least one sensor to determine a status of each said at least one sensor and to detect when said status of any sensor is a fault status;

preselecting means operable by a user of the security device for preselecting at least one telephone number to be called upon occurrence of said fault status;

automatic call-up means for automatically calling said preselected telephone number to report any said fault status;

answering circuit means for receiving and answering an incoming telephone call received over said telephone lines, and responsive to reception of a user input transmitted over the telephone lines and designating a selected said at least one sensor to be monitored for monitoring said at least one sensor, and for transmitting the status of said selected at least one sensor over the telephone lines; and identification circuit means responsive to a received user query, requesting the identity of the security device, for transmitting identification information over the telephone line; wherin said identification circuit means comprises a counter for counting through a plurality of count outputs, a digital switch having multiple stages, each preset with a digit of an identifier, and a tone generator for selectively generating a pluraliyt of tones, said multiple stages of said digital switch being responsive in turn to respective count outputs for sequentially activating said tone generator to generate corresponding sequential tones, whereby to transmit said identification information.

2. The security device of claim 1, wherein said automatic call-up means comprises a selection circuit settable by the user of the device in accordance with a monitoring frequency desired by the user for generating a monitoring signal at time intervals corresponding to said monitoring frequency desired by the user, said monitoring means being responsive to said monitoring signal for monitoring said at least one sensor to determine said fault status of any said at least one sensor, and generating a fault signal, said automatic call-up means further comprising a call-up circuit responsive to said fault signal for automatically calling said preselected telephone number to report said fault status of any said at least one sensor.

3. The security device of claim 1, wherein said answering circuit means comprises a decoder circuit settable by the user of the device in accordance with a security code preselected by the user, and responsive to reception of said security code, as transmitted by the user over said telephone lines, for issuing a validation signal, said monitoring means being responsive to said validation signal, and to a user input designating a selected at least one sensor to be monitored, for monitoring said selected at least one sensor to determine a status of said selected at least one sensor, said security device further comprising a transmitting circuit for transmitting the status of said selected at least one sensor over the telephone lines to the user.

4. The security device of claim 3, further comprising deceiver circuit means responsive to reception of the telephone call over the telephone lines for transmitting a deceiver ring signal over the telephone lines, whereby to deceive an unknowing caller into thinking no one is at home.

5. The security device of claim 4, wherein said deceiver ring signal comprises repetition of a ring followed by a period of silence and said user transmits said security code during said periods of silence of said deceiver ring signal.

6. The security device of claim 1, further comprising test means responsive to a user test input for actuating said automatic call-up means for automatically calling said preselcted telephone number, whereby to test said automatic call-up means.

7. The security device of claim 4, wherein said deceiver circuit means comprises a tone generator for selectively generating a deceiver ring signal, and a clock circuit for selectively actuating said tone generator to generate said deceiver ring signal for a predetermined time duration at predetermined time intervals.

8. The security device of claim 1, further comprising hang-up means responsive to a user hang-up input signal transmitted by the user over the telephone lines for terminating the telephone call.

9. The security device of claim 1, further comprising hang-up means responsive to a signal from the telephone lines, indicating that the user has hung up, for terminating the telephone call.

10. A security device connected to at least one sensor and to telephone lines for automatically calling a user of the device at a preselected telephone number to report a fault status fo any said at least one sensor, said device comprising:
selection means settable by the user of the device in accordance with a monitoring frequency desired by the user for generating a monitor signal at time intervals corresponding to said monitoring frequency desired by the user;
monitoring means responsive to said monitor signal for monitoring said at least one sensor to determine the fault status of any said at least one sensor, and generating a fault signal; and
call-up means responsive to said fault signal for automatically calling said preselected telephone number to report said fault status of any said at least one sensor;
wherein said call-up means comprises a counter for counting through a plurality of count outputs, a digital switch having multiple stages, each preset with a digit of said preselected telephone number, and a tone generator for selectively generating a pluraltiy of tones, said multiple stages of said digital switch being responsive in turn to respective count outputs for sequentially actuating said tone generator to generate corresponding sequential tones, whereby to automatically call said preselected telephone number.

11. The security device of claim 10, further comprising test means responsive to a user test command input for actuating said autumtaic call-up means for automatically calling said predetermined telephone number, whereby to test said automatic call-up means.

12. A security device connected to at least one sensor and to telephone lines for automatically calling a user of the device at a preselected telephone number to report a fault status of any said at least one sensor, said device comprising:
selection means settable by the suer of the device in accordance with a monitoring frequency desired by the user for generating a monitor signal at time intervals corresponding to said monitoring frequency desired by the user;
monitoring means responsive to said monitor signal for monitoring said at least one sensor to determine the fault status of any said at least one sensor, and generating a fault signal; and
call-up means responsive to said fault signal for automatically calling said preselected telephone number to report said fault status of any said at least one sensor;
further comprising identification circuit means responsive to a received user query, requesting the identity of the security device, for transmitting identification information over the telephone lines;
wherein said identification circuit means comprises a counter for counting through a plurality of count outputs, a digital switch having multiple stages, each preset with a digit of an identifier, and a tone generator for selectively generating a plurality of tones, said multiple stages of said digital switch being responsive in turn to respective count outputs for sequentially activating said tone generator to generate corresponding sequential tones, whereby to transmit said identification information.

13. A security device connected to telephone lines and to at least one sensor, comprising:
monitoring means for monitoring said at least one sensor to determine a status of each said at least one sensor and to detect when said status of any sensor is a fault status;
automatic call-up means settable by the user of the device in accordance with a preselected telephone number to be called for automatically calling said preselected telephone number to report any said fault status; and answering circuit means for receiving and answering an incoming telephone call received over said telephone lines, and responsive to reception of a user input transmitted over the telephone lines and designating a selected said at least one sensor to be monitored for monitoring said at least one sensor, and for transmitting the status of said selected at least one sensor over the telephone lines;

said device further ocmprising identification circuit means responsive to a received user query, requesting the identity of the security device, for transmitting identification information over the telephone lines;

wherein said identification circuit means comprises a counter for counting through a plurality of count outputs, a digital switch having multiple stages, each preset with a digit of an identifier, and a tone generator for selectively generating a plurality of tones, said multiple stages of said digital switch being responsive in turn to respective count outputs for sequentially activating said tone generator to generate corresponding sequential tones, whereby to transmit said identification information.

14. The security device of claim 13, further comprising deceiver circuit means responsive to reception of the telephone call over the telephone lines for transmitting a deceiver ring signal over the telephone lines, whereby to deceive an unknowing caller into thinking no one is at home.

15. The security device of claim 14, further comprising inhibiting means responsive to said validation signal from said decoder means for inhibiting said deceiver means. Fc

* * * * *